United States Patent [19]

Livingston et al.

[11] Patent Number: 5,780,838
[45] Date of Patent: Jul. 14, 1998

[54] LASER CROSSBODY TRACKING SYSTEM AND METHOD

[75] Inventors: Peter M. Livingston, Palos Verdes Estates; Alvin D. Schnurr, Los Angeles, both of Calif.

[73] Assignee: TRW Inc., Redondo Beach, Calif.

[21] Appl. No.: 631,645

[22] Filed: Apr. 2, 1996

[51] Int. Cl.$^6$ ............................................. G01S 17/66
[52] U.S. Cl. ........................................ 250/203.2; 356/4.01
[58] Field of Search ................................ 250/203.1, 203.2, 250/203.3, 203.6, 216, 234, 235; 356/4.01, 5.09, 5.11

[56] References Cited

U.S. PATENT DOCUMENTS

| 4,063,819 | 12/1977 | Hayes | 250/203.2 |
| 5,198,607 | 3/1993 | Livingston et al. | 89/1.11 |
| 5,216,236 | 6/1993 | Blais | 250/203.2 |
| 5,253,033 | 10/1993 | Lipchak et al. | 356/5.14 |

OTHER PUBLICATIONS

"Boresighting a Gaussian beam on a specular target point: a method using conical scan", Ahmed Erteza, *Applied Optics*, vol. 15, No. 3 (Mar. 1976), pp. 656–660.

"Laser beam active tracking for specular objects to actions of λ/D", Livingston, et al, *Applied Optics*, vol. 24, No. 13 (Jul. 1985) pp. 1919–1925.

*Primary Examiner*—Edward P. Westin
*Assistant Examiner*—John R. Lee
*Attorney, Agent, or Firm*—Michael S. Yatsko

[57] ABSTRACT

A laser tracking system steers a beam of laser energy which is dithered in two directions to scan the surface of a moving object. A laser energy detector detects laser energy reflected from the target. Reflected energy is filtered to distinguish dither frequencies for signals in both directions, which signals are independently analyzed to determine the location of the target in relation to the laser beam. A bias signal is generated which causes the beam of laser energy to be steered toward the target, to the tracked location on-target, or modified signals steer a portion of the beam to an optimum track location on target while offsetting most of the beam's energy to a second engagement location on target. Also, a track testing system is capable of monitoring a laser beam focused on a missile and determining the effective laser engagement on a spinning target.

24 Claims, 8 Drawing Sheets

LASER CROSSBODY TRACKING SYSTEM AND METHOD

BACKGROUND OF THE INVENTION

1. Technical Field

The present invention relates generally to systems for tracking a moving object and, more particularly, to a non-imaging laser-based system and method of tracking and engaging targeted objects and a system and method of identifying target hits.

2. Discussion

Tracking systems have been developed and deployed for tracking a targeted moving object such as a rocket or missile generally for purposes of engaging the object in an attempt to destroy or disable the object for military purposes. Generally speaking, the conventional tracking system is referred to as an imaging tracker and employs an imaging device such as an electronic camera that captures an image and selects a portion of that image and then attempts to lock on to it with respect to the frame of the image. According to one tracking system, the process of acquisition of a target generally consists of finding the target, fixing the target in a large field of view tracker and then transferring the instantaneous measurements of the target's position to a narrow field of view tracker. In turn, the narrow field of view tracker fixes the picture of the target with respect to the borders of the frame, generally known as the track gate. With the image fixed in the frame, electronic circuitry configured as a servo loop generates an error signal which causes a high power laser beam or other weaponry to track and engage the target in an attempt to destroy the target.

Accordingly, the conventional imaging tracker generally requires and relies on continuous use of one or more imaging devices such as electronic cameras to first determine the approximate location and then the current instantaneous position of the targeted object. In addition, some conventional imaging trackers try to determine target velocity information and attempt to predict the anticipated projection of the target. In an optically targeted weapon, known conventional imaging trackers are associated with a separate high power laser beam or other weaponry engagement means for attempting to destroy or disable the detected object that is being targeted. The high power laser beam weaponry is independent of the imaging device and is typically steered in response to the calculated optimum position and velocity vector as determined by the processed product of the imaging device, with a targeting offset angle to engage the optimum vulnerable zone on the target.

While the conventional imaging tracker systems may effectively locate the target, a number of limitations exist with respect to the ability to continuously track a moving target and effectively engage it. First, with the conventional imaging approach, it has been found that the high power laser beam used for engagement may interfere with the imaging device and therefore obliterate the track point, thereby causing it to lose track of the targeted object. To reduce interference of the laser beam with the imaging device, the high power laser beam can be offset from the imaging device. However, the offset laser beam may introduce additional error to the overall tracking scheme and does not always effectively reduce or eliminate the interference problems. Second, the ability to use imaging sensor data to effectively point the laser depends on an accurate boresight of the sensor line of sight with the laser line of site. Historically, maintaining an adequate boresight under stressing environmental conditions has been difficult. Third, the conventional imaging tracker is generally limited to the resolution of the imaging tracker itself. That is, when the target is very small and below the resolution limit of the imaging tracker, the ability to get a fix on the target may be limited by the resolution of the tracker. Accordingly, the conventional imaging tracker generally cannot track targets smaller than the tracker's resolution limit without exhibiting unacceptably large track errors. Even with resolvable targets, track errors proportional to the second and third derivative of the track angle with respect to time and to the derivative of the aimpoint offset angle may become unacceptably large, especially for close-in fly-by encounters. This results in a limitation on the size of a target that may effectively be tracked. Without remedy, the effectiveness of the conventional high energy laser weapon is limited. Consequentially, for a given power, longer dwell times are generally required to achieve adequate killing fluence, thereby shortening keep out ranges and further draining the laser fuel system.

Additionally, disturbances, either small disturbances of the pointing or tracking systems, or propagation of the high power laser beam, may cause the laser beam to miss the target. Similarly, laser beam propagation through an optically inhomogeneous atmosphere may also cause the laser beam to be diverted away from the target. Such disturbances to the laser beam tend to go undetected since the conventional imaging device that is tracking the target is independent of the engaging high power laser beam weaponry.

Furthermore, there is a need to effectively determine the accuracy of a laser weapon tracking system by determining the effective kill engagement potential of a laser beam on the target. That is, in order to determine the effectiveness of a given laser weapon tracking system, it is desirable to be able to score laser beam "hits" on a moving target, especially in preliminary tracking tests using a low power laser. Presently, there is a need to independently assess the instantaneous location of a laser beam impinging on a moving missile target for purposes of testing its effectiveness without actually requiring destruction of the target.

Accordingly, it is therefore desirable to provide for a system and method of tracking moving objects with a laser beam that is less susceptible to error and interference problems.

It is further desirable to provide for a laser beam tracking system that tracks and locks onto a moving target with a high energy laser beam that is independent of a well boresighted imaging tracker device.

Yet, it is also desirable to provide for such a laser tracker that is capable of tracking small targets, including unresolvable targets, irrespective of imaging tracker resolution.

Also, it is desirable to provide for a system and method of independently accessing laser beam "hits" on a moving target for purposes of testing the kill effectiveness of laser weapon systems.

SUMMARY OF THE INVENTION

In accordance with the teachings of the present invention, a system and method for tracking a moving object with laser energy is provided. The system includes a laser generator for generating a beam of laser energy and a beam steerer for steering the beam of laser energy so as to track a targeted moving object. The beam steerer steers the beam of laser energy in an oscillatory fashion, preferably in two orthogonal directions. The high power laser beam oscillates in a first direction at a first dither frequency and in a second direction at a second dither frequency which is distinguishable from the first dither frequency. A telescope gathers laser energy that is reflected off of the targeted object and a detector detects the amount of reflected energy received. The detected energy is filtered to separate the first and second dither frequencies for each channel. The filtered signals are synchronously detected by multiplying each channel by a sinusoidal function derived from the laser mirror generator for that channel. It is an observed fact that when the beam centroid is exactly centered on, for example, a cylindrical target midline, the reflected power contains only harmonics of the dither frequency. If displaced to either side, the dither frequency component magnitude increases proportional to the displacement with a sign indicating which side. A bias signal is generated from the received reflected synchronously detected power proportional to the beam centroid displacement from the target midline, having a sign that is either plus or minus, depending on which side the beam centroid falls. This causes the beam steerer to steer the laser beam to center it on target, thereby tracking the targeted object.

The tracking system of the present invention may operate for each channel in a centroid track mode for tracking a central portion of an object or in an edge-track mode to detect and track an edge. In the centroid track mode, the laser beam locks-up on the central portion of the targeted object for the direction scanned by one or both channels. In the edge-track mode, the gathered signal is differentiated before synchronous detection for one or both channels so as to distinguish an edge and lock-on to the edge for the given channel.

Additionally, the tracking system of the present invention may operate by utilizing a portion of the beam's energy for target tracking, either on target centroid or on one or more edges, and further offsetting the bulk of the beam's energy to a separate known vulnerable region on the target. This offset could be done in either a temporal or spatial domain. In the temporal domain the offset could be realized by alternately closing the tracking loop and offsetting the beam by the desired amount at high frequency. In the spatial domain the offset could be achieved by physically dividing the beam into a large and a small portion with a known angular offset, with the lower power segment of the beam being used to accomplish the tracking function. This approach allows the tracking system of the present invention to maintain track on an edge or feature of the target that is optimum for tracking purposes, while devoting most of its energy to a vulnerable zone that is optimum for engagement.

According to another aspect of the present invention, a system and method of independently assessing laser beam "hits" on a moving target may be achieved. The testing methodology includes assigning scoring regions within a plurality of bands on a target missile. Each band contains a select number of reflecting strips, preferably provided with absorbing paint separating the reflecting strips. Each region will have a different number of strips which distinguishes one band from the other bands. Laser energy is reflected from the missile target and the region of engagement is determined as a function of the number of strips and the missile roll rate.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENTS

Figure 1:
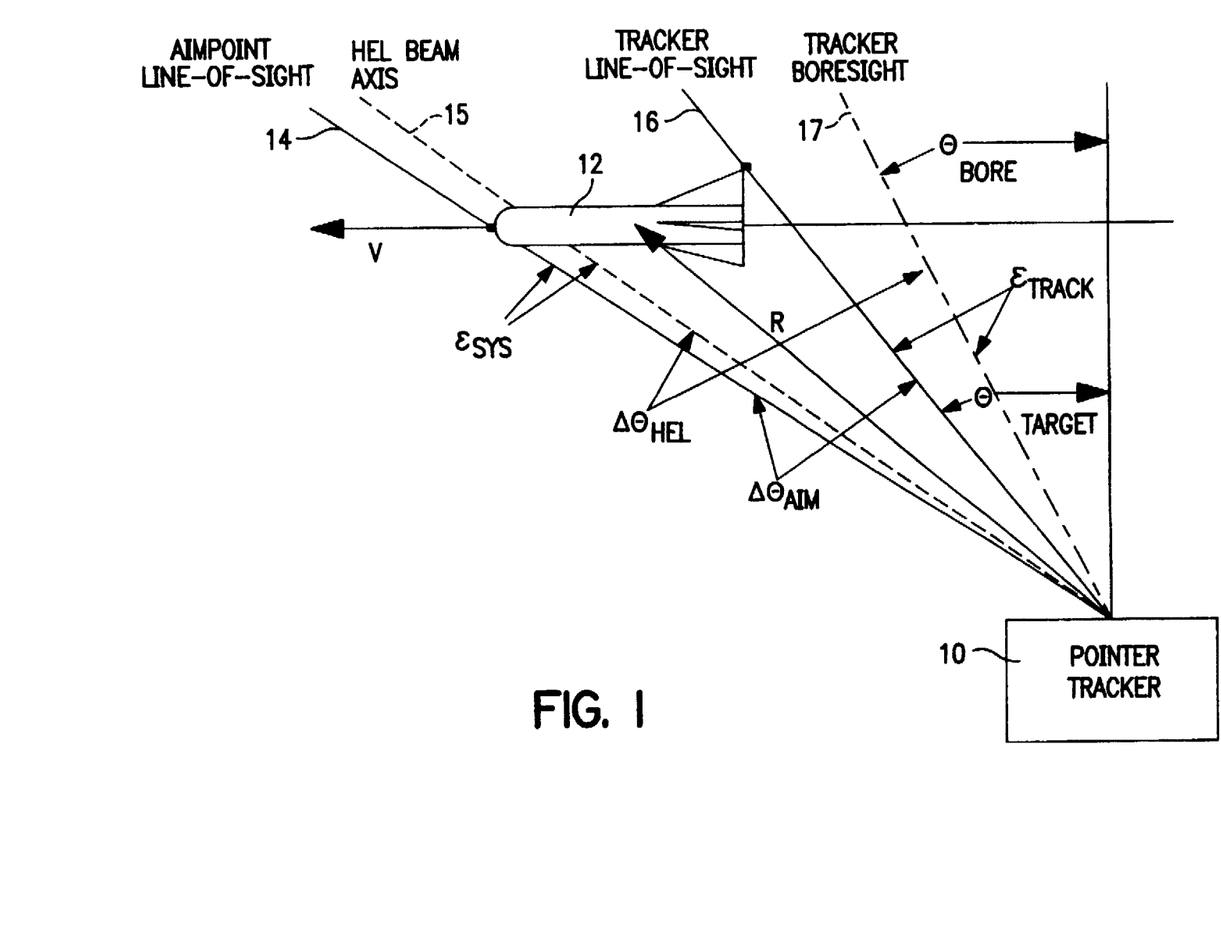
FIG. 1 illustrates angle definitions for tracking a missile target with a tracker.

Turning now to FIG. 1, tracking angle definitions are defined in relation to a missile target 12 and a tracking system 10. The tracking angles are defined in relation to selected vectors which will be used to describe the tracking system 10 of the present invention. A moving target such as missile 12 is shown executing a fly-by at an instantaneous distance R from the tracking system 10. Target missile 12 has a velocity V with target and boresight angles being large in general compared to the small differential angles shown prefixed by deltas (Δ). Also shown in FIG. 1 is an aimpoint line-of-sight vector 14 defined by tracker 10 and the front end centroid of missile 12. A tracker line-of-sight vector 16 is defined by tracker 10 and an edge-edge point near the rear end of missile 12. Also included is an HEL beam axis 15 and tracker boresight vector 17.

A system error $\epsilon_{sys}$ is shown defined as the difference between the instantaneous HEL beam axis 15 and the selected aimpoint line-of-sight vector 14. A track error $\epsilon_{track}$ is defined as the difference between the tracker boresight vector 17 and the tracker line-of-sight vector 16. The tracking system 10 of the present invention as will be explained hereinafter reduces or eliminates the system error $\epsilon_{sys}$ which may otherwise arise in a conventional imaging tracker due to poor target resolution, poor estimation of the missile roll-axis based upon the measured missile velocity vector or angular acceleration and rate of acceleration errors which may occur, especially near the distance-of-closest approach range.

The differential angles shown include the HEL laser beam displacement $\Delta\Theta_{hel}$ which is defined as the angular displacement between the tracker boresight vector 17 and the HEL beam axis 15. The differential aim angle $\Delta\Theta_{aim}$ is defined as the angular displacement between the tracker line-of-sight vector 16 and the aimpoint line-of-sight vector 14. The tracker boresight displacement $\Theta_{bore}$ is defined as the angular displacement of the tracker boresight vector 17 from the vertical axis, while the target angle $\Theta_{target}$ is defined as the angular displacement of the tracker line-of-sight vector 16 from the vertical axis.

Figure 2:
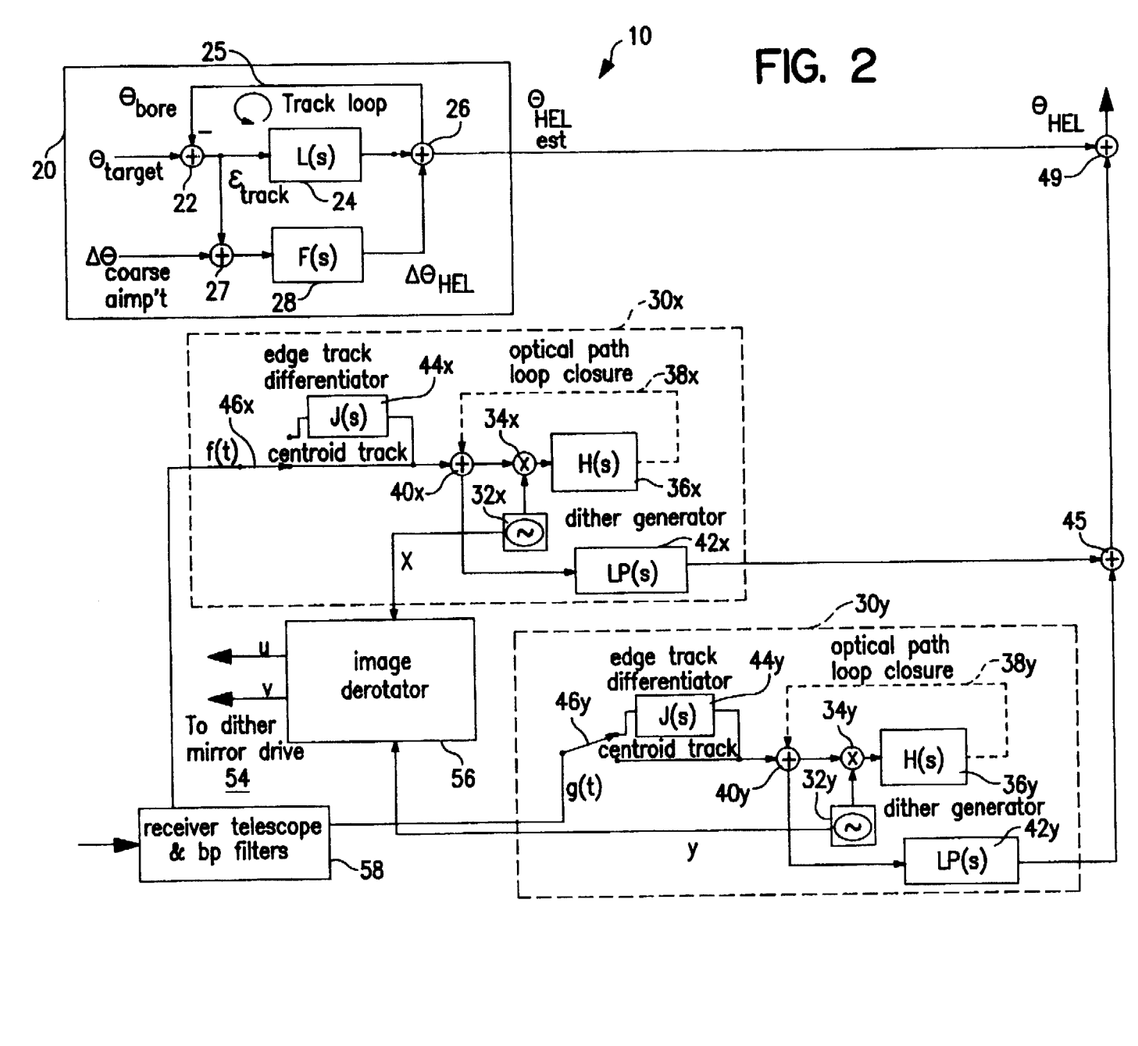
FIG. 2 is a block diagram illustrating the tracking system of the present invention integrated in combination with an imaging tracker.

Referring to FIG. 2, the tracking system 10 of the present invention is shown integrated with a conventional imaging tracker 20. The conventional imaging tracker 20 may be employed with the tracking system 10 of the present invention to initially determine an approximate location of a targeted object. This in turn enables a high power laser beam of the tracking system 10 of the present invention to be positioned in the general vicinity of a target and close enough to enable tracking and subsequent lock-on to engage the target. While the conventional imaging tracker 20 is shown in conjunction with the present invention, it should be appreciated that the tracking system 10 may be used with or without the imaging tracker 20 and that other forms of trackers may be used in place of imaging tracker 20.

The conventional imaging tracker 20 as shown includes an imaging device such as an electronic camera (not shown). The imaging tracker 20 detects the energy reflected from objects within a wide field of view. The imaging tracker 20 defines a target within the frames of an image and determines the target angle $\Theta_{target}$ and change in aimpoint $\Delta\Theta_{aim}$. The target angle $\Theta_{target}$ is input to an adder 22 along with the bore-sight angle $\Theta_{bore}$ as determined from a track loop 25. This summation will generally define the track error $\epsilon_{track}$ which is input to a first filter L(s) 24. The change in aimpoint $\Delta\Theta_{aim}$ is added along with the track error $\epsilon_{track}$ via adder 27 and the summation is input into a second filter F(s) 28 which derives $\Delta\Theta_{HEL}$. Output $\Delta\Theta_{HEL}$ is added with the output of the first filter L(s) 24 via adder 26 to provide for an estimation of a laser beam angle $\Theta_{HEL}$. This information derived from the imaging tracker 20 can advantageously provide a rough estimation of the position of a targeted object.

The tracking system 10 of the present invention preferably provides for target tracking in two dimensions, however, one dimensional target tracking may be employed according to the teachings of the present invention. As illustrated in FIG. 2, to accomplish target tracking in a first direction defined by the X coordinate, a first servo loop 30x is provided. Similarly, to accomplish target tracking in a second direction defined by the Y coordinate, a second servo loop 30y is provided. First servo loop 30x provides centroid or edge tracking along the X coordinate, while the second servo loop 30y provides centroid or edge tracking along the Y coordinate. According to the preferred embodiment, the X and Y coordinates are orthogonal to one another and are preferably arranged parallel and perpendicular to the roll axis of target 12.

The tracking system 10 further includes a receiver telescope and bandpass filters 58 which receive scattered laser energy from a relatively wide field of view. The receiver telescope and bandpass filters 58 filter the individual first and second dither frequencies and pass the corresponding dither frequency signals to the respective first and second servo loops 30x and 30y. That is, the signal containing the first dither frequency is filtered via telescope and bandpass filters 58 and passed on to the first servo loop 30x, while the second dither frequency signal is likewise passed on to the second servo loop 30y.

Also shown in FIG. 2 is an image derotator 56 which is coupled to the dither generators 32x and 32y. Image derotator 56 derotates the two dither frequency signals from the X and Y generators by taking the appropriate linear combination so that the orthogonal dither frequency signals are preferably parallel and perpendicular to the target roll axis. Angle information needed to implement derotation may be derived from the imaging tracker 20. As outputs, the image derotator 56 provides corresponding orthogonal signals U and V to the dither mirror drive 54.

The first and second servo loops 30x and 30y are identical servo control loops, each processing signals for a designated coordinate. Referring to first servo loop 30x, a switch 46x selects between an edge track differentiator 44x and a centroid track mode of operation. In the edge track differentiator mode, the tracking system 10 provides for edge detection along the X coordinate, while the centroid track mode of operation enables the tracking system 10 to track the central portion of the target along the X coordinate. According to one embodiment, the X coordinate may be defined as the roll axis of missile target 12.

Also included in the first servo loop 30x is an adder 40x which receives either the edge track differentiator output or centroid track output. In addition, adder 40x receives an optical path loop closure signal 38x as part of the enclosed loop path. The summation provided by adder 40x is fed to a multiplier 34x which multiplies a signal from a first dither generator 32x by the summation. First dither generator 32x provides the first dither frequency for the oscillatory signal along the X coordinate. The output of multiplier 34x is passed on to filter H(s) 36x which in turn provides the optical path loop closure signal 38x. In effect, the filter 36x provides integration and filtering. Another filter LP(s) 42x provides a bias output to adder 45.

Similar to first servo loop 30x, the second servo loop 30y contains switch 46y for switching between an edge track differentiator 44y and a centroid track mode of operation. Also included is adder 40y; multiplier 34y, and dither generator 32y for providing the second dither frequency. The first and second dither frequencies are distinguishable from each other, yet preferably incommensurate so the ratio thereof is not reducible to a small whole number. A filter H(s) 36y similarly provides integration and filtering which is fed back along an optical path loop closure signal 38y to adder 40y. Additionally, another filter LP(s) 42y provides a bias output from adder 40y to adder 45 which in turn sums outputs from both servo loops 30x and 30y. The output of adder 45 is provided as an input to adder 49 along with the output of the imaging tracker 20.

Figure 3:
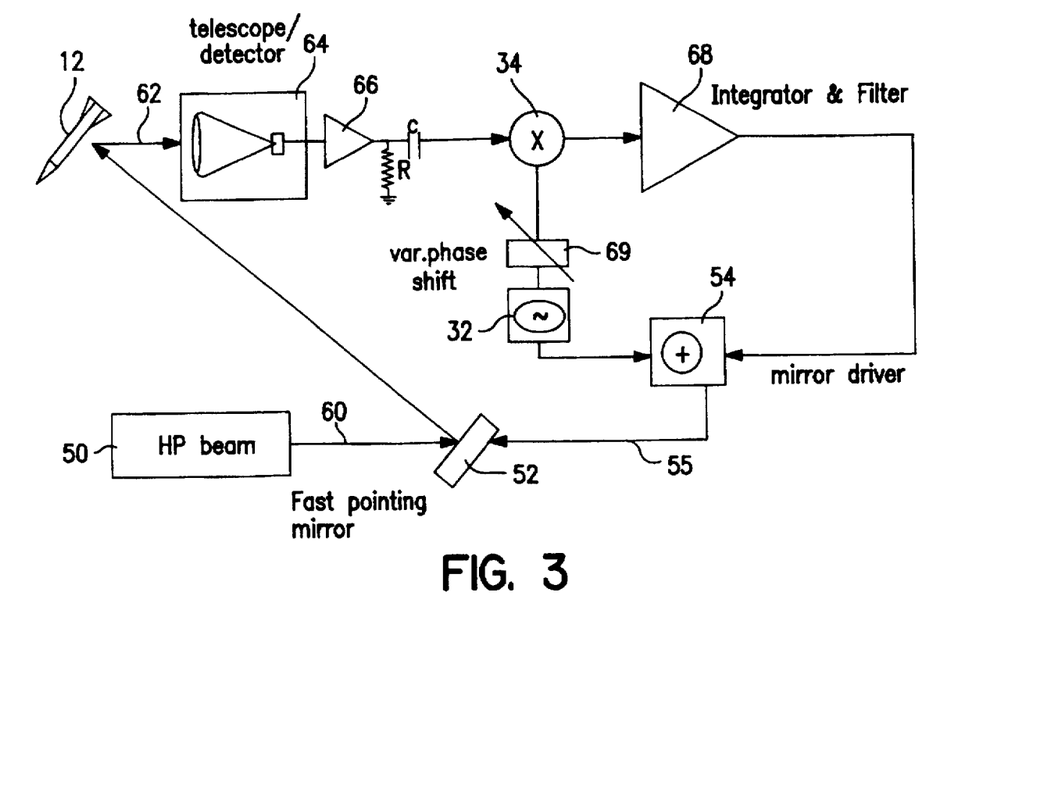
FIG. 3 further illustrates the tracking system of the present invention for providing one-dimensional tracking according to one embodiment.

Referring to FIG. 3, the tracking system 10 is illustrated in more detail for tracking targets in one dimension given one servo loop such as servo loop 30x. A high power laser beam generator 50 focuses a high power laser beam 60 onto a fast pointing mirror 52 for controlled pointing of the laser beam toward target 12. Fast pointing mirror 52 is a servo-controlled pointing mirror generally mounted on a gimball (not shown) which is steered in response to a bias signal 55. When the laser beam 60 engages or is very near target 12, laser energy is reflected from target 12.

The tracking system 10 further includes a telescope/detector 64 which is generally positioned to collect laser energy from a relatively wide field of view. Since the telescope/detector 64 has a sufficiently large field of view, precision-pointing of the telescope/detector 64 is not needed. The telescope/detector 64 may include a telescope having a detector located at the focal plane thereof for detecting the total scattered energy received by the telescope. The telescope/detector 64 produces an electrical signal proportional to the intensity of the light gathered therewith. Telescope/detector 64 preferably includes a filter, such as a bandpass filter, which limits the received energy to the laser wavelength of the high power laser beam 60. Also, telescope/detector 64 preferably has bandpass filters for separating dither frequencies, especially when used for two-dimensional tracking.

The electrical signal output from telescope/detector 64 is amplified via amplifier 66 and passed through an R-C circuit made up of capacitor C and resistor R. Multiplier 34 mixes the electrical signal with the oscillatory signal produced by the dither generator 32 and variable phase shift block 69. The output of multiplier 34 is transmitted through integrator and filter 68. Accordingly, the filtered signal for the given channel is synchronously detected by multiplying it with a cosine signal derived from the laser mirror dither generator 32 and passed on to the integrator and filter 68. The output of the integrator and filter 68 is summed with the oscillatory signal generated by the dither generator 32 to produce a resultant bias signal. The bias signal causes the fast steering mirror 52 to move the reflecting surface thereof at a rate proportional to the bias signal in such a direction so as to null-out the bias or error signal along the corresponding dimension, i.e., dither axis.

Figure 4:
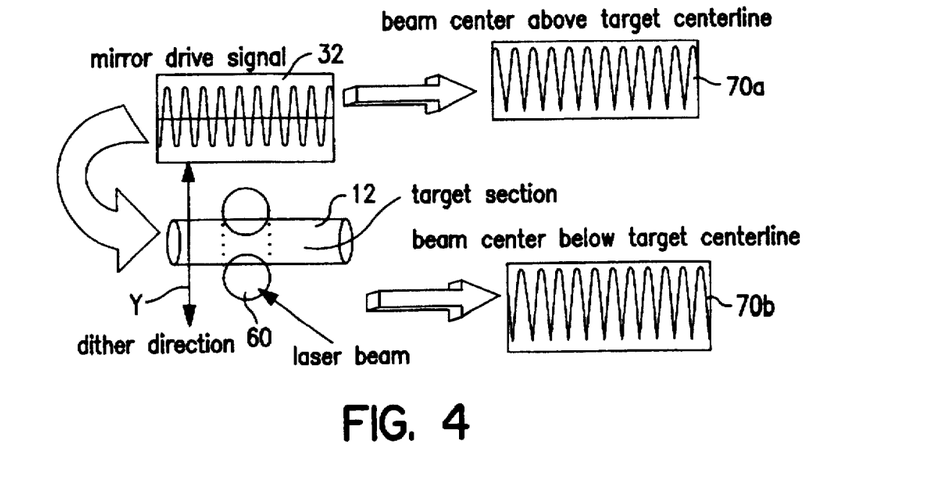
FIG. 4 illustrates one-dimensional dither tracking along the centerline axis of a target and shows the phase change of the detected signal as the beam centroid passes over the target midline.

Operation of the tracking system 10 will now be described herein in connection with the one-dimensional tracking arrangement shown in FIG. 3. The high power laser beam generator 50 generates a high power laser beam 60 directed off of the fast pointing mirror 52 toward a target such as missile 12. As previously described, a conventional imaging tracker 20 may first be employed to determine an approximate location of the target, thereby allowing the high power laser beam 60 to be placed in the general vicinity of target missile 12. With particular reference to FIG. 4, the high power laser beam 60 is shown oscillating in accordance with the dither frequency along the dither axis, shown as the Y coordinate, which is perpendicular to the roll axis of missile 12. The high power laser beam 60 oscillates in response to the mirror drive signal 32, thereby passing through the body portion of the missile 12 along the Y axis according to the oscillating frequency. The laser beam 60 is steered to execute a periodic scan across the short dimension of the missile body and in response produces reflected energy signals as shown by the two detected waveforms 70a and 70b shown on the right side of FIG. 4. The two detected signal waveforms 70a and 70b differ in phase by 180 degrees relative to each other depending on whether the average beam center of laser beam 60 is on one side or the other (i.e., high or low) with respect to the centerline of target 12. Hence, detecting this phase relative to the mirror driver tells the tracking system 10 whether to steer the high power laser beam 60 down or up.

Accordingly, the laser tracking system 10 of the present invention will scan across target 12 in one or two dimensions and detect reflected energy from the target. The reflected energy is analyzed to determine a target location in relation to the laser beam and further will determine the bias signal necessary to bring the laser beam closer into engagement with the target missile 12. When lock-up is achieved, the dither amplitude may be reduced to a maintenance value. For example, a maintenance value of ten percent (10 %) of the spot with the target may suffice according to one example. For military destruction purposes, the high energy laser beam 60 may be provided with enough energy to quickly disable or even destroy the target missile 12.

Figure 5:
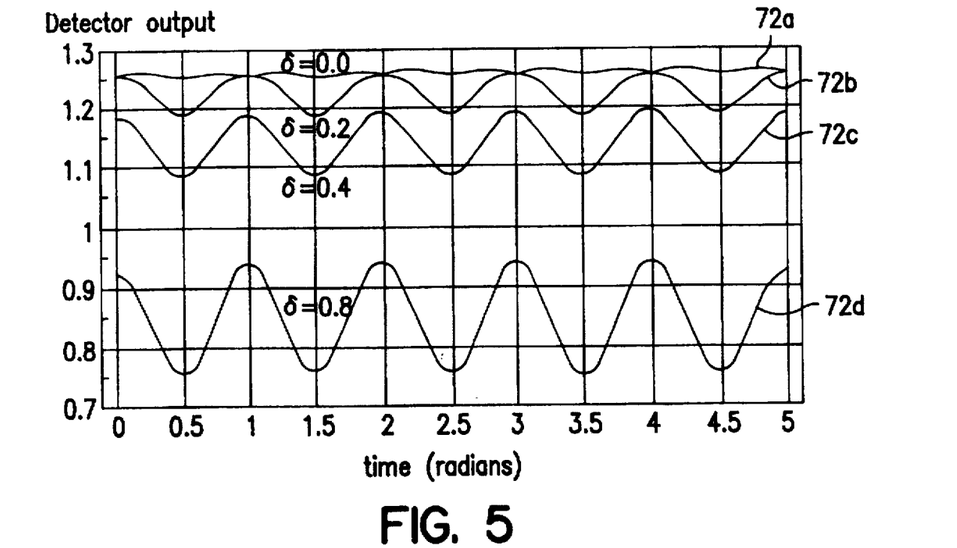
FIG. 5 is a graph illustrating reflected signal amplitudes for various laser beam displacements from the center of the missile along one-dimension.

Referring to FIG. 5, the output of the telescope/detector 64 is shown and is examined for dither in a single dimension. $\delta$ represents the displacement of the laser beam center from the target centerline measured in units of the beam radius. The amplitude of the telescope/detector 64 output increases as the as high power laser beam 60 is moved closer to the center of the target 12. Also, the detected signal remaining when the beam is centered on the target is the second harmonic which generally exhibits one-half of the period as evidenced by $\delta$ equal to 0.0. If the plot of FIG. 5 were to continue through zero, curves labeled $\delta$ equal to 0.2, 0.4, 0.8 would be reproduced, except the phases would be shifted by 180 degrees.

Figure 6:
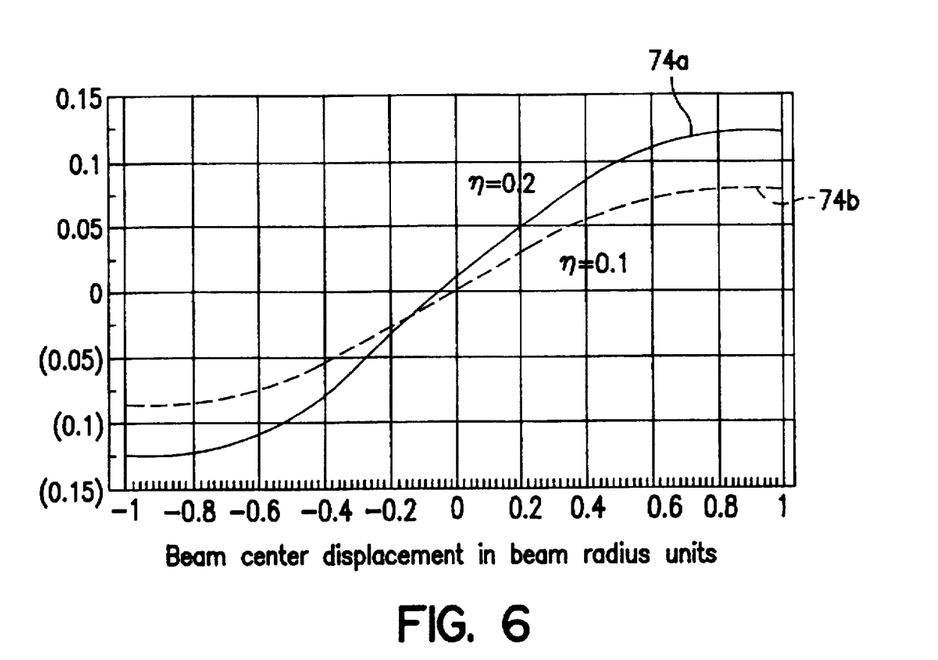
FIG. 6 illustrates an error characteristic curve (error signal as a function of beam-centroid-target center displacement) illustrating relative error for several dither magnitudes.

FIG. 6 illustrates a plot of the error characteristic curve which shows the output of the integrator and filter 68. The error signal passes through zero and changes sign as the average laser beam center passes through the target midline. This error signal is directly proportional to dither magnitude, here expressed in units of the beam radius, at small magnitudes. The relative error signal has a slope that remains finite as the beam center displacement passes through zero which means that there is basically no "dead zone" in the servo-control domain and consequently no static residual error. Also, the capture range of the laser beam shown provides a two beam radii capture range from the center of the target to the center of the beam.

Figure 7:
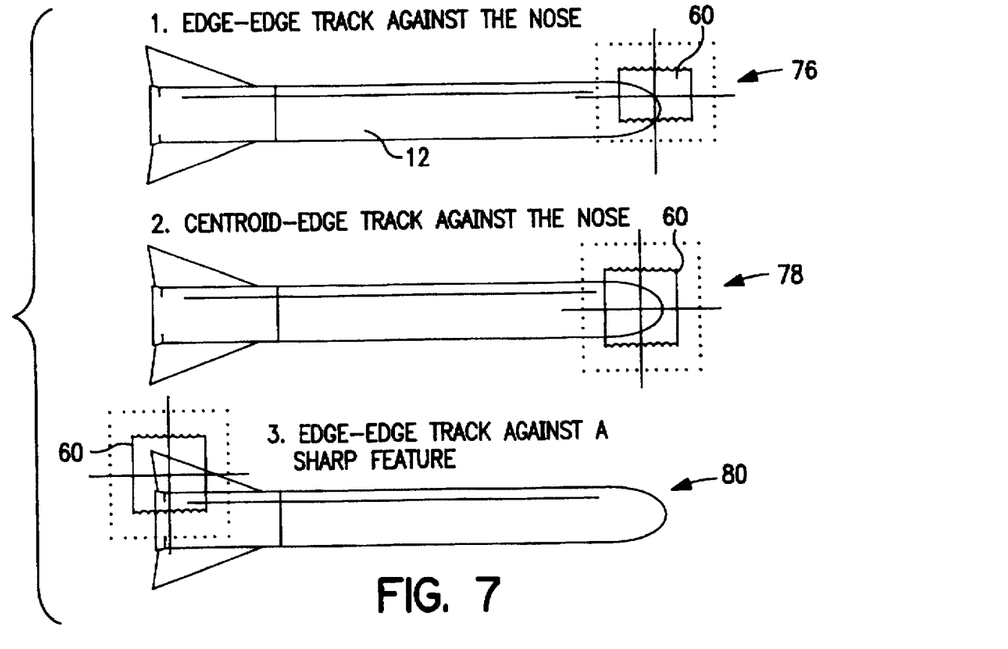
FIG. 7 illustrates edge tracking of a missile according to various possible combinations of edge and centroid tracking with the present invention.

Thus far, operation of the tracking system 10 has been discussed for the centroid tracking mode. It should be appreciated that the concept is also applicable to tracking target edges by introducing a differentiating filter, preferably after the telescope and before the synchronous detector. Examples of edge-edge and centroid-edge tracking with the tracking system 10 are illustrated in FIG. 7. Illustration 76 shows edge-edge as tracking against the nose portion of target missile 12. Tracking system 10 detects an edge in both the X coordinate and Y coordinate in order to distinguish edge-edge detection. Illustration 78 shows centroid-edge tracking against the nose portion of target missile 12. In this example, centroid detection is performed in the Y coordinate, while edge detection is provided along the X coordinate. Illustration 80 further shows edge-edge tracking against a sharp feature near the rear portion of target missile 12. It should be appreciated that various combinations of edge and centroid tracking may be achieved with the present invention to track and engage any of a variety of objects which may be targeted.

The rectangular area centered on the cross-hair is a lissajou scanned pattern traced by the centroid of the high power beam 60 as it dithers at the two different dither frequencies in orthogonal directions. The lissajou pattern is a distinctive feature of the two-dimensional dither track. In effect, the two-dimensional tracking provides a conical scan in which the two dither frequencies are chosen to create a dense, uniformally filled scan pattern in the detection process made applicable to two-dimensional targets with finite dimensions. Analysis of scattered signals from various target shapes is made in each dimension to determine the corresponding error signal necessary to bring the high power laser beam 60 into engagement with the desired tracking edge or centroid of the target.

Figure 8:
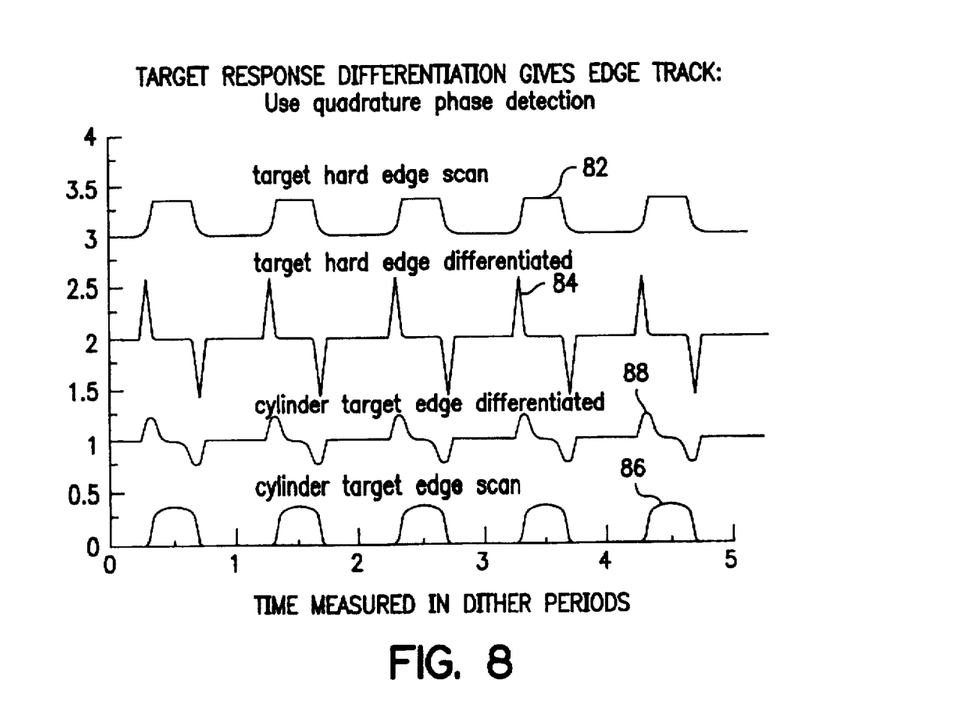
FIG. 8 illustrates received signals for edge detection before and after differentiation from flat and cylindrical targets.
Figure 9:
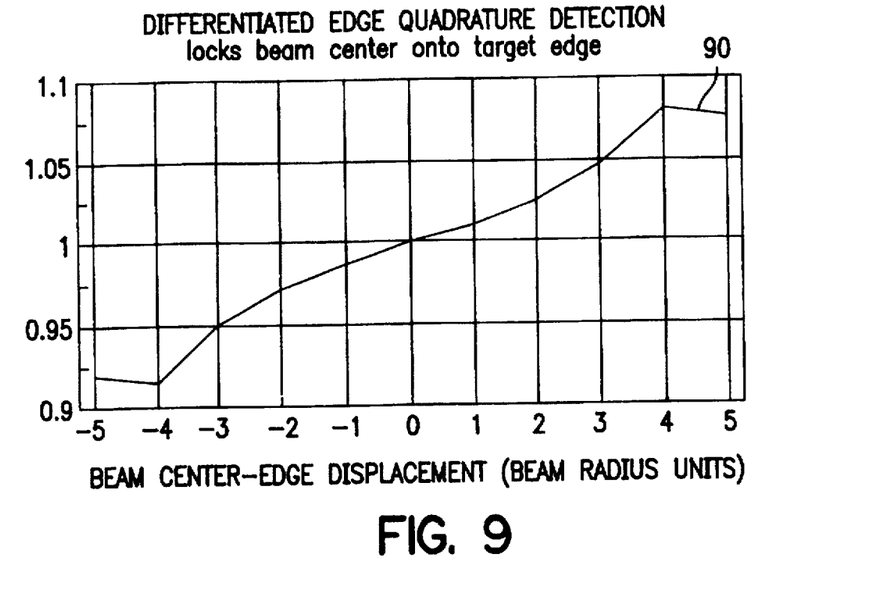
FIG. 9 illustrates an error signal derived from the edge detection according to one embodiment of the present invention.

To further illustrate edge detection, FIG. 8 shows how a received signal may look from a target consisting of a flat rectangular strip and a cylinder having a similar width. The beam line-of-sight is near but not on the target. The target response for the rectangular strip is shown by signal 82 while the edge differentiated response therefore is provided by signal 84. Similarly, the cylinder target edge scan is shown by signal 86, while its edge differentiated waveform is provided by signal 88. Accordingly, the addition of a differentiator turns a centroid detector into an edge detector and therefore the concept is used to establish a lock-point on a target at the intersection of two one-dimensional dither-lock lines. An error signal may then be derived from the edge detection as shown in FIG. 9.

Figure 10:
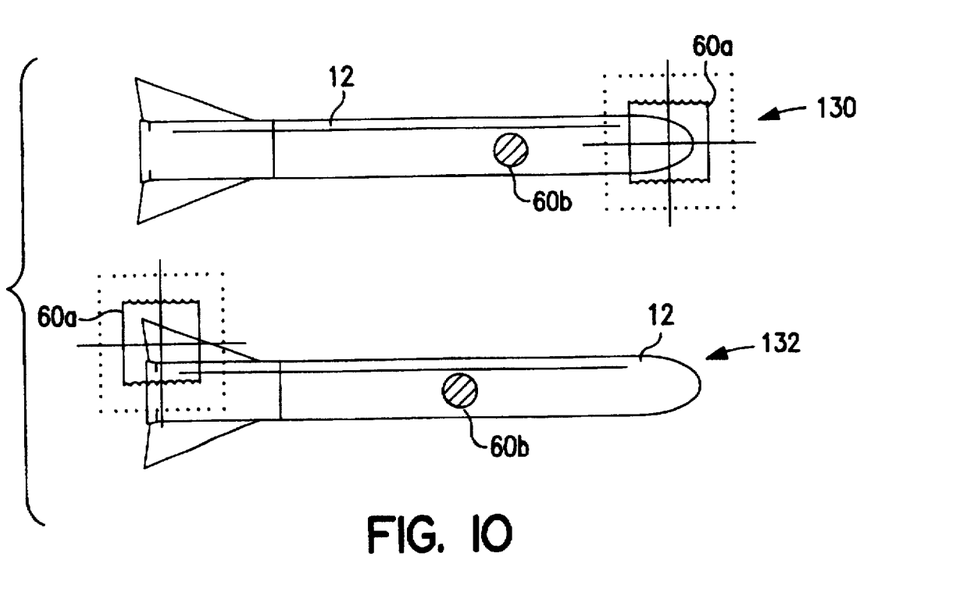
FIG. 10 illustrates tracking with two offset beam locations using either a temporal or spatial domain according to an alternate embodiment.

Alternately, the tracking system 10 of the present invention may be embodied to provide offset tracking according to either a spatial or temporal mode of operation. Referring to FIG. 10, illustrations 130 and 132 show the utilization of a small portion 60a of the laser beam energy 60 for target tracking either on target centroid or on one or more edges, and further employing the bulk or large portion 60b of the laser beam energy 60 to a separate known vulnerable region on the target 12. Accordingly, the low energy portion 60a of the laser beam tracks target 12, while the large portion 60b of the laser energy is offset by a desired amount to engage a desired region on the target 12, generally in an attempt to destroy the target 12. As shown in illustration 130, the low energy portion 60a tracks a centroid-edge against the nose of target 12, while high energy portion 60b is offset toward a midportion of target 12. Illustration 132 shows an edge-edge track with the low energy portion 60a against a sharp feature near the rear of the target 12, while the high energy portion 60b is directed to a desired central region of target 12.

To accomplish the desired laser beam offset, either a temporal or spatial domain may be employed. In the temporal domain, the offset can be achieved by alternately closing the tracking loop and offsetting the laser beam by the desired amount at a high frequency. Accordingly, the temporal domain will allow the laser beam to alternate between a target region and a kill region. When doing so, it is preferred that the laser beam has a low energy level when in the target region and switches to a high energy level in the kill region. In the spatial domain, the offset between the low energy portion 60a and high portion 60b of the laser energy can be achieved by physically dividing the laser beam into a large energy portion and a small energy portion with a known angular offset, preferably with the lower power segment of the beam being used to accomplish the tracking function. This approach allows the tracking system 10 of the present invention to maintain track on an edge or feature of the target 12 that is optimum for tracking purposes, while devoting most of the available energy to a vulnerable region that is optimum for engagement. For either the temporal or spatial domain, the amount of offset can be provided by an angular offset which may be determined based on a desired region for engagement and distance to the target 12.

Figure 11:
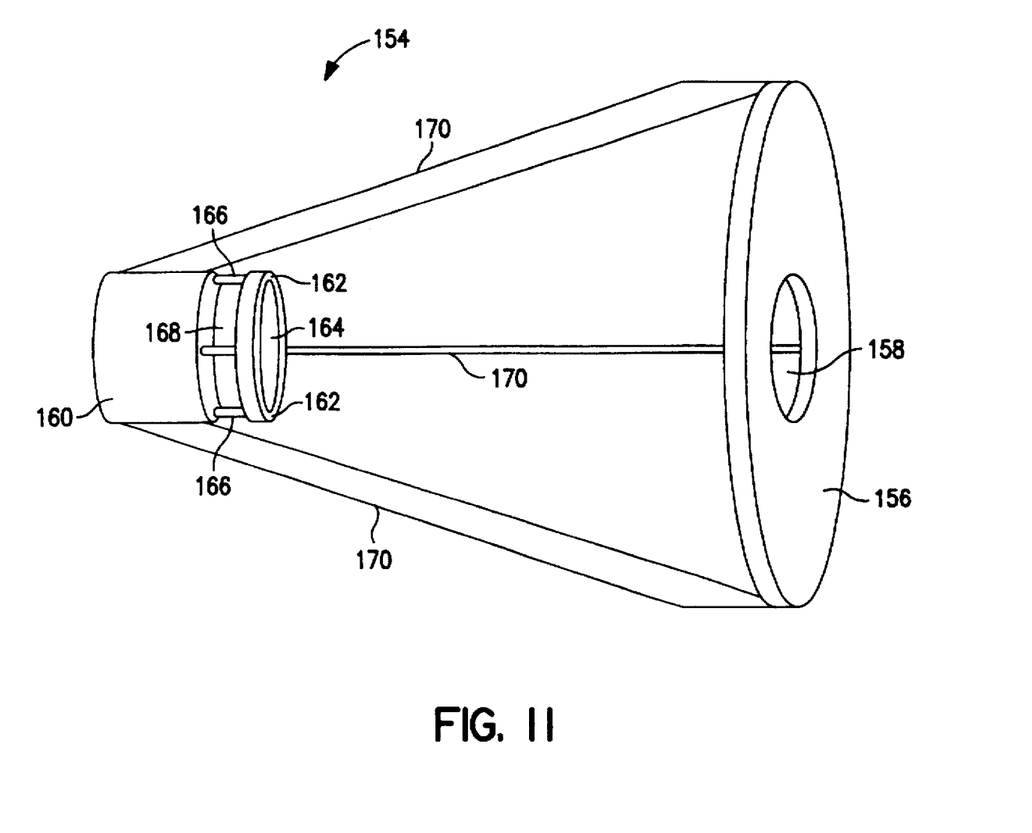
FIG. 11 is a side view of a primary mirror and actuated secondary mirror assembly for providing two offset beams in a spatial domain according to the alternate embodiment.

FIG. 11 illustrates a mirror assembly 154 that may be used to realize the divided high energy portion 60b and low energy portion 60a of laser energy according to the spatial domain. The mirror assembly 154 includes a combination of a concave primary mirror 156 connected in a fixed relationship with a convex secondary mirror assembly 160 via support struts 170. The primary mirror 156 has a center hole 158 formed therein for receiving a high energy laser beam 60. The secondary mirror assembly 160 includes a convex mirror surface 164 fixed in place via a central mirror mount 168 at the central portion of assembly 160. The secondary mirror assembly 160 further includes a reflective surface 162 formed around the annulus of the outer perimeter of reflective surface 164. Outer annulus reflective surface 162 is positioned via a plurality of movable piston actuators 166. Four piston actuators 166 may suffice according to one embodiment. Piston actuators 166 change the orientation of the outer annulus reflective surface 162 relative to the mirror assembly 160 so as to provide the low energy laser beam 60a modulating at the appropriate dither frequencies in the X and Y coordinate directions.

In operation, laser energy such as energy 60 is received through center hole 158 of primary mirror 166. The laser energy reflects off convex secondary mirror surface 164 and fills the primary mirror 156 which focuses the energy toward the desired location to make up the high energy beam 60b. At the same time, laser energy is reflected from the outer annulus reflective surface 162 of secondary mirror assembly 160 and reflected off of primary mirror 156 at low energy beam 60a, independent of the central portion of the secondary mirror 164. Relative placement of the piston actuators 166 causes the annular light beam 60a to focus toward a different position on target 12 which is offset from the main portion of the high power beam 60b itself. Moreover, the piston actuators 166 will vibrate in such a way as to cause the displaced annular beam focus to dither as previously described. Both dither travel and tilt offset of the secondary mirror will likely be in the microradian range and hence a standard afocal telescope design which meets other system requirements may be employed.

Accordingly, tracking is accomplished by providing a spatial or temporal offset between beam power deposited on a tracking location and on an offset engagement location. A fraction of the beam's power $P_f$ may be used to track in the spatial domain, while a periodic fraction $T_f$ of a beam's track period $T_p$ (where $T_p$ equals the time between the beam revisiting a track location) may be used to track in the temporal domain. For temporal offset, the time $T_f$ spent irradiating the engagement location is less than the total track period or revisit time $T_p$. For spatial offset, $P_f$, the fraction of the beam's power used for tracking must of course be small compared with the total beam power $P_{Total}$, for efficient engagement.

In spatial offset, a beam segment or beamlet ($P_f$) is angularly separated from the engagement beam ($P_T-P_F$) in the pointer tracker, allowing adjustment of the desired engagement location with constant tracking on the desired tracking location by varying $\Theta_{offset}$. In temporal offset, the beam locks onto its optimum track location for a time period $T_F$ and is then offset by $\Theta_{offset}$ to the desired engagement aimpoint for a time $T_p-T_F$. The energy beam then returns to the desired trackpoint for a time $T_f$ and repeats the switched time cycle.

Figure 12:
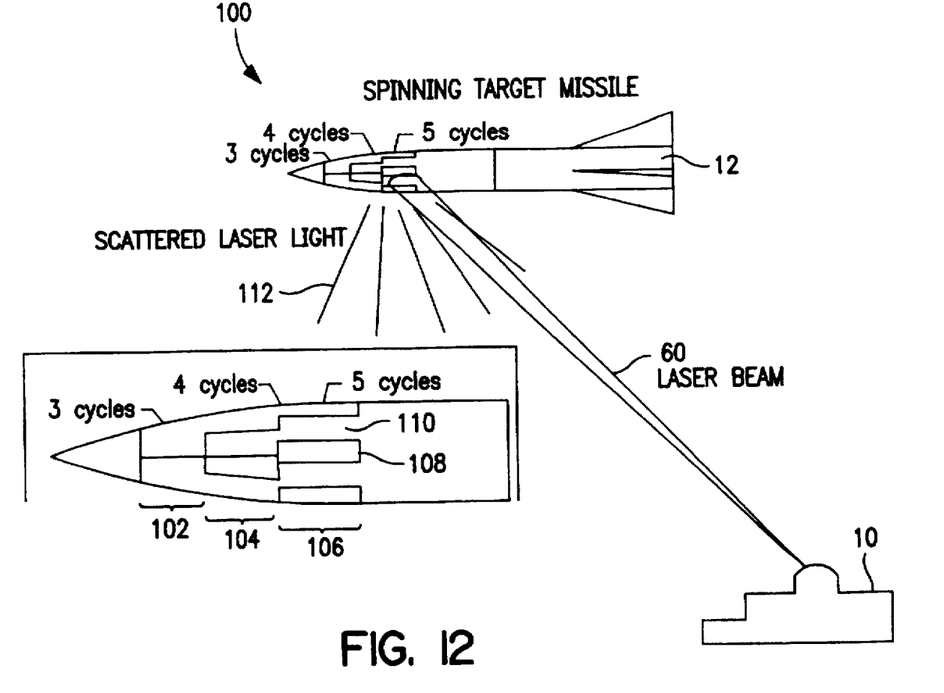
FIG. 12 is a schematic illustration of a laser tracking test system employing a test missile according to a laser engagement test of the present invention.
Figure 13:
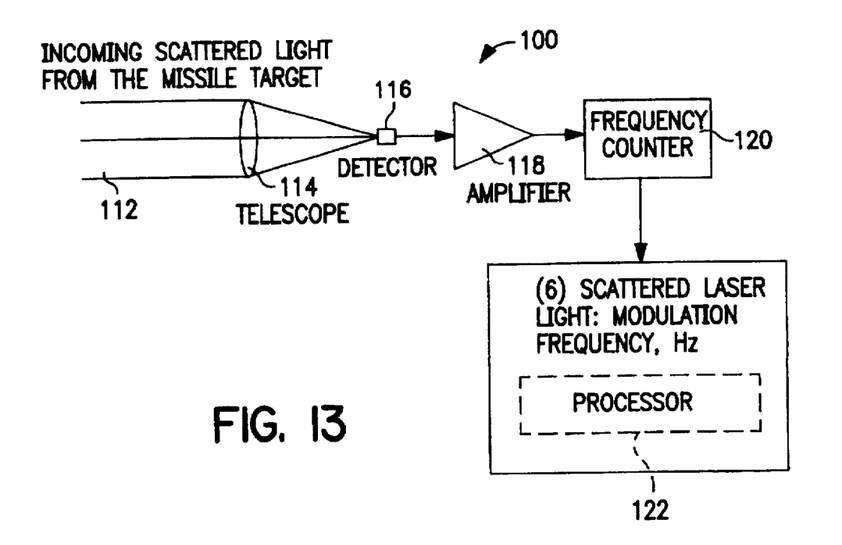
FIG. 13 is a block diagram further illustrating the laser tracking test system of the present invention.

Turning now to FIGS. 12 and 13, a laser tracking system is illustrated therein for use in "scoring" infrared laser beam hits on a moving target for purposes of evaluating laser tracking system performance. Since tracking systems are sometimes subject to error, the laser tracking testing system 100 provides an independent method for test scoring laser hits on a target. Referring particularly to FIG. 10, a missile target 12 is shown in relation to tracking system 10 and laser beam 60. While the tracking system 10 described herein generally provides a high power laser beam, it should be appreciated that for purposes of testing laser beam tracking and engagement, a lower power laser beam may suffice and is generally preferred.

Also shown in FIG. 12 is an exploded view of a front portion of missile 12. According to the testing methodology, a scoring region is initially determined and divided into a plurality of bands such as scoring bands 102, 104 and 106. Each of the scoring bands 102, 104 and 106 contains a unique number of reflecting strips, different from the number of strips in the other bands. According to a preferred embodiment, the scoring bands 102, 104 and 106 are provided with a width of approximately the expected laser beam width. Each band includes a predetermined number of reflecting strips 110 which are separated by non-reflecting reflecting regions 108. According to the example shown, scoring band 102 contains three reflecting strips, scoring band 104 contains four reflecting strips, while scoring band 106 contains five reflecting strips. Reflecting strips 110 for each band may be formed by initially painting the infrared on the exterior surface of the missile throughout each band of the scoring region and scraping away the absorbing paint to form the reflecting strips 110, while leaving regions of IR absorbing paint to form the non-reflecting regions 108. The reflecting strips 110 and non-reflecting regions 108 are preferably formed at equal intervals around the scoring band of the missile 12 circumference and parallel to the missile roll axis. While three scoring bands are shown within the scoring region, containing three, four and five reflecting strips, it should be appreciated that a different number of scoring bands and various combinations of reflecting strips may be employed without departing from the spirit of the invention.

For a laser tracking system test, laser beam 60 is focused on the scoring region of missile 12 in accordance with a given tracking system operation. As the low power laser beam 60 focuses along the roll axis of missile 12, the reflected return energy is picked up and received by a simple telescope 114 and focused onto a detector 116. The focused energy detected by detector 116 is provided as an electrical signal to amplifier 118 and the amplified signal is passed on to a frequency counter 120. Frequency counter 120 provides the scattered laser light modulation frequency which is preferably passed on to a processor 122 or other computing device to determine which scoring band within the scoring region the laser beam 60 is tracking and engaged with.

When the laser beam 60 intercepts one of the scoring regions 102, 104 or 106, the reflected energy will be modulated at rates equal to the number of reflecting strips 110 multiplied by the missile roll rate. The missile roll rate may be determined from monitoring a fudicial strip or from independent radar, if available. With a fiducial strip, the fiducial strip has a unique length which may be used to count the roll rate of the missile 12. Accordingly, processor 122 may collect the modulated frequency and divide it by the determined missile roll rate to determine the number of strips within the region engaged and therefore determine which scoring band 102, 104 or 106 from which the energy is reflecting. The laser tracking test system 100 may compare the desired tracking point with the actual location of the laser beam on the particular scoring to determine any error in a given tracking system. The tracking system test 100 advantageously provides an independent means for accessing imaging tracker performance and is insensitive to atmosphere effects and details of the beam irradiance distribution.

While this invention has been described in connection with a particular example thereof, no limitation is intended except as defined by the following claims. A skilled practitioner will realize that other modifications can be made without departing from the spirit of this invention after studying the specification and drawings.

What is claimed is:

1. A tracking system for tracking a moving object with laser energy, said tracking system comprising:

a laser generator for generating a beam of laser energy;

a beam steerer for steering the beam of laser energy; a first dither generator for causing said beam steerer to dither the beam of laser energy in a first direction according to a first frequency;

a second dither generator for causing said beam steerer to dither the beam of laser energy in a second direction according to a second frequency;

a laser energy detector for detecting laser energy reflected from a targeted object;

an image derotator connected between said first and second dither generators and said beam steerer that derotates first and second dither frequency signals output from said first and second dither generators so that the first and second dither frequency signals are parallel and perpendicular, respectively, to a target reference axis; and means for generating a bias signal to cause the beam steerer to steer the beam of laser energy so as to track the targeted object in response to the detected laser energy.

2. The tracking system as defined in claim 1 wherein said beam steerer oscillates the beam of laser energy in a sinusoidal motion in both the first and second directions.

3. The tracking system as defined in claim 1 wherein said means for generating said bias signal comprises a multiplier for multiplying the detected energy with one of the dither generator frequencies and a lowpass filter/integrator connected to the multiplier so as to produce said bias signal.

4. The laser tracking system as defined in claim 3 wherein said means for generating the bias signal further comprises a filter for passing fundamental and second harmonic frequency energy.

5. The laser tracking system as defined in claim 1 further comprising filters for distinguishing the first and second frequencies from the reflected signals.

6. The tracking system as defined in claim 1 wherein said first and second directions are orthogonal to one another.

7. The tracking system as defined in claim 1 wherein said steered beam of laser energy is divided into a first and a second beam, said first beam tracking the targeted object and said second beam being offset from the first beam to engage a desired region.

8. The tracking system as defined in claim 7 wherein said first beam is steered in response to the first and second frequencies via piston actuated reflective surface, while said second beam is focused onto said desired region.

9. The laser tracking system as defined in claim 1 wherein said steered beam of laser energy is switched between a tracking region for tracking the targeted object and an offset engagement region for engaging a desired engagement region on the target.

10. The laser tracking system as defined in claim 9 wherein the laser energy beam provides a lower energy level when tracking and a higher energy level when engaging the desired engagement region.

11. A tracking system for tracking a moving object with laser energy, said tracking system comprising:

a laser generator for generating a beam of laser energy;

a beam steerer for steering the entire beam of laser energy and oscillating the beam along a first axis at a first frequency;

a laser energy detector for detecting laser energy reflected from a targeted object; and means for generating a bias signal to cause the beam steerer to steer the beam of laser energy so as to track the targeted object in response to the detected laser energy.

12. The tracking system as defined in claim 11 further comprising filter means for passing detected laser energy having aid first frequency.

13. A tracking system for tracking a moving object with laser energy, said tracking system comprising:

a laser generator for generating laser energy;

means for steering said laser energy so that at least some of said laser energy tracks a moving object and at least some of said laser energy engages a desired region on said moving object;

a first dither generator for causing said means for steering to dither said at least some of said laser energy for tracking in a first direction according to a first frequency;

a second dither generator for causing said means for steering to dither said at least some of said laser energy for tracking in a second direction according to a second frequency;

a laser energy detector for detecting laser energy reflected from a targeted object;

an image derotator connected between said first and second dither generators and said beam steerer that derotates dither frequency signals output from said first and second dither generators so that the dither frequency signals are parallel and perpendicular, respectively, to a target reference axis; and means for generating a signal to cause the means for steering to steer said at least some of said laser energy for engaging the target so as to track the targeted object in response to the detected laser energy.

14. The tracking system as defined in claim 13 wherein said laser energy is divided into a first and a second beam, said first beam tracking the targeted object and said second beam offset from the first beam so as to engage a desired region on the object.

15. The tracking system as defined in claim 14 wherein said means for steering comprises a primary mirror arranged in a fixed relationship with a secondary mirror for providing said second beam, said mirror further including a steerable reflective surface for steering a portion of said laser energy to provide said first beam.

16. The tracking system as defined in claim 13 wherein said laser energy is switched between a tracking region and an engagement region on the targeted object so that said laser energy may repetitively switch between a tracking location and an engagement location which is offset from the tracking location.

17. A method for tracking a moving object with laser energy, said method comprising the steps of:

generating a beam of laser energy;

steering the beam of laser energy so as to oscillate the entire beam in a first direction according to a first frequency;

detecting laser energy reflected from a targeted object;

generating a bias signal in response to said detected laser energy and said first frequency; and steering the beam of laser energy in response to said bias signal so as to track the targeted object.

18. The method as defined in claim 17 further comprising the step of steering the beam of laser energy in a second direction according to a second frequency and filtering said detected signal to separate the first and second frequencies.

19. A method of tracking a moving object with laser energy, said method comprising the steps of:

generating a beam of laser energy;

steering the beam of laser energy so as to oscillate the beam along a first axis according to a first frequency;

steering the beam of laser energy so as to oscillate the beam along a second axis according to a second frequency;

detecting laser energy reflected from a targeted object;

generating a signal in response to said detected laser energy; filtering said signal so as to distinguish said first frequency from said second frequency; and derotating the signal so that the first and second frequencies are orthogonally oriented with respect to one another; and steering the beam of laser energy in response to said filtered, derotated signal so as to track the targeted object and engage said object with said beam of laser energy.

20. The method as defined in claim 19 further comprising the step of dividing said beam of laser energy into a first and a second beam, tracking said targeted object with said first beam and engaging a desired engagement region with said second beam which is offset from said first beam.

21. The method as defined in claim 20 wherein the first beam has a lower energy level than said second beam.

22. The method as defined in claim 19 wherein said beam of laser energy is switched between a tracking region and an engagement region which is offset from the tracking region, said beam of laser energy tracking said target and then switching to said engagement region in a time shared manner.

23. A system for testing scoring of a laser tracker on a spinning target, said system comprising:

a plurality of scoring bands provided on a scoring region of a spinning target, each of said scoring bands containing a unique number of reflecting strips;

a laser energy source for radiating a beam of laser energy from a laser tracker, said a beam of laser energy attempting to engage the spinning target;

means for detecting reflected laser energy reflected from the reflecting strips within said scoring bands;

means for detecting the frequency of reflected energy received from said reflecting strips;

means for determining roll rate of the spinning target; and means for determining which scoring band is engaged by the laser beam as a function of the roll rate and frequency.

24. A method for testing scoring of a laser tracker on a spinning target, said system comprising these steps of:

providing a plurality of scoring bands on a scoring region of a spinning target, each of the scoring bands containing a unique number of reflecting strips;

radiating a beam of laser energy from a laser tracker which attempts to engage the spinning target;

detecting reflected laser energy reflected from the reflecting strips within said scoring bands on the spinning target;

detecting the frequency of reflected energy received from the reflecting strips;

determining a rate of roll of the spinning target; and determining which of the scoring bands is engaged by the laser beam as a function of the roll rate and determined frequency.

* * * * *